(12) United States Patent
Sato et al.

(10) Patent No.: US 11,262,847 B2
(45) Date of Patent: Mar. 1, 2022

(54) FORCE SENSE PRESENTING APPARATUS

(71) Applicant: ArachnoForce Co., Ltd., Tokyo-to (JP)

(72) Inventors: Makoto Sato, Tokyo (JP); Kenji Honda, Tokyo (JP)

(73) Assignee: ARACHNOFORCE CO., LTD., Tokyo-To (JP)

( * ) Notice: Subject to any disclaimer, the term of this patent is extended or adjusted under 35 U.S.C. 154(b) by 0 days.

(21) Appl. No.: 16/965,328

(22) PCT Filed: Jan. 24, 2019

(86) PCT No.: PCT/JP2019/002244
§ 371 (c)(1),
(2) Date: Feb. 12, 2021

(87) PCT Pub. No.: WO2019/146689
PCT Pub. Date: Aug. 1, 2019

(65) Prior Publication Data
US 2021/0232223 A1 Jul. 29, 2021

(30) Foreign Application Priority Data
Jan. 29, 2018 (JP) .............................. JP2018-012391

(51) Int. Cl.
*G06F 3/01* (2006.01)
(52) U.S. Cl.
CPC .............. *G06F 3/016* (2013.01); *G06F 3/011* (2013.01)
(58) Field of Classification Search
CPC .......... G05B 2219/40553; G06F 3/016; G06F 3/04886; B60W 50/16; F15B 13/14; H01H 13/85
See application file for complete search history.

(56) References Cited

U.S. PATENT DOCUMENTS 10,406,059 B2 * 9/2019 Agrawal ............... A61B 5/1121
11,083,967 B1 * 8/2021 Summit ................. G06F 3/011
(Continued)

FOREIGN PATENT DOCUMENTS

| JP | 2002304246 A | 10/2002 |
|---|---|---|
| JP | 2016207005 A | 12/2016 |

OTHER PUBLICATIONS

International Search Report (ISR) (and English translation thereof) dated Apr. 9, 2019 issued in International Application No. PCT/JP2019/002244.
(Continued)

*Primary Examiner* — William Lu
(74) *Attorney, Agent, or Firm* — Holtz, Holtz & Volek PC

(57) ABSTRACT

In a force sense presenting apparatus having a right-hand force sense presenting unit and a left-hand force sense presenting unit, one side of an upper frame of the right-hand force sense presenting unit is linearly coupled to the one side of the upper frame of the left-hand force sense presenting unit. A right-hand rear-coupled frame couples an approximately middle location of the upper frame in the right-hand force sense presenting unit to one side of a lower frame in the right-hand force sense presenting unit so that the upper frame and the lower frame are approximately T-shaped viewed from above. A left-hand rear-coupled frame couples an approximately middle location of the upper frame in the left-hand force sense presenting unit to the one side of the lower frame in the left-hand force sense presenting unit so that the upper frame and the lower frame are approximately T-shaped viewed from above.

15 Claims, 15 Drawing Sheets

(56) References Cited

U.S. PATENT DOCUMENTS

| | | | | |
|---|---|---|---|---|
| 2001/0038376 A1* | 11/2001 | Sato | ................ | G06F 3/016 |
| | | | | 345/156 |
| 2005/0024331 A1* | 2/2005 | Berkley | ................ | G06F 3/038 |
| | | | | 345/161 |
| 2008/0150891 A1* | 6/2008 | Berkley | ................ | G06F 3/016 |
| | | | | 345/156 |
| 2009/0066100 A1* | 3/2009 | Bosscher | ............ | B25J 17/0266 |
| | | | | 294/86.4 |
| 2021/0001171 A1* | 1/2021 | Fung | ................ | G06F 3/016 |
| 2021/0096648 A1* | 4/2021 | Summit | ............ | A63B 69/0048 |

OTHER PUBLICATIONS

Written Opinion dated Apr. 9, 2019 issued in International Application PCT/JP2019/002244.

* cited by examiner

Fig.3
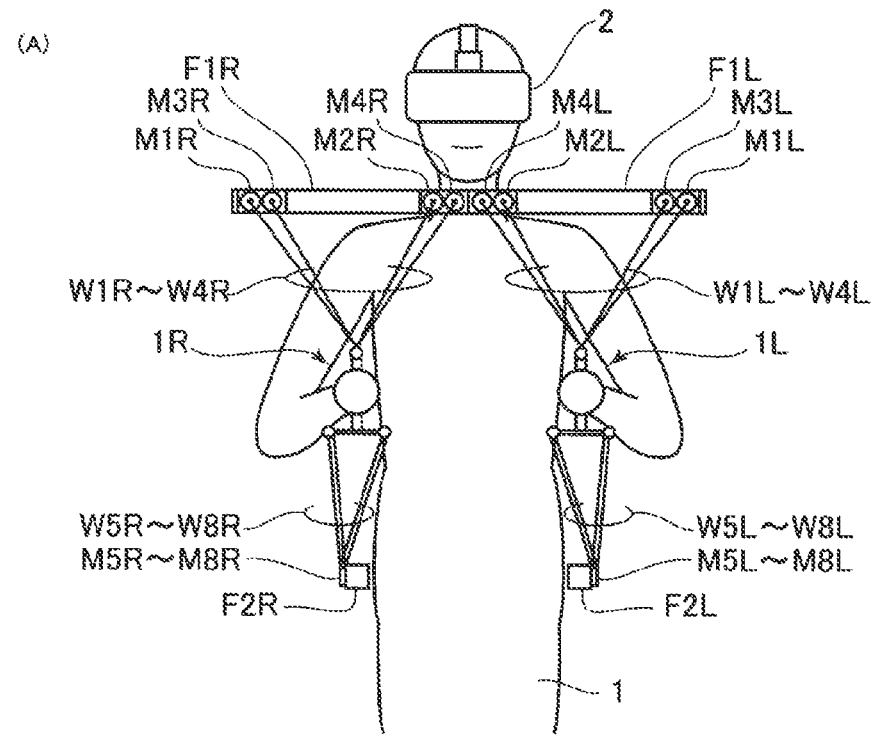
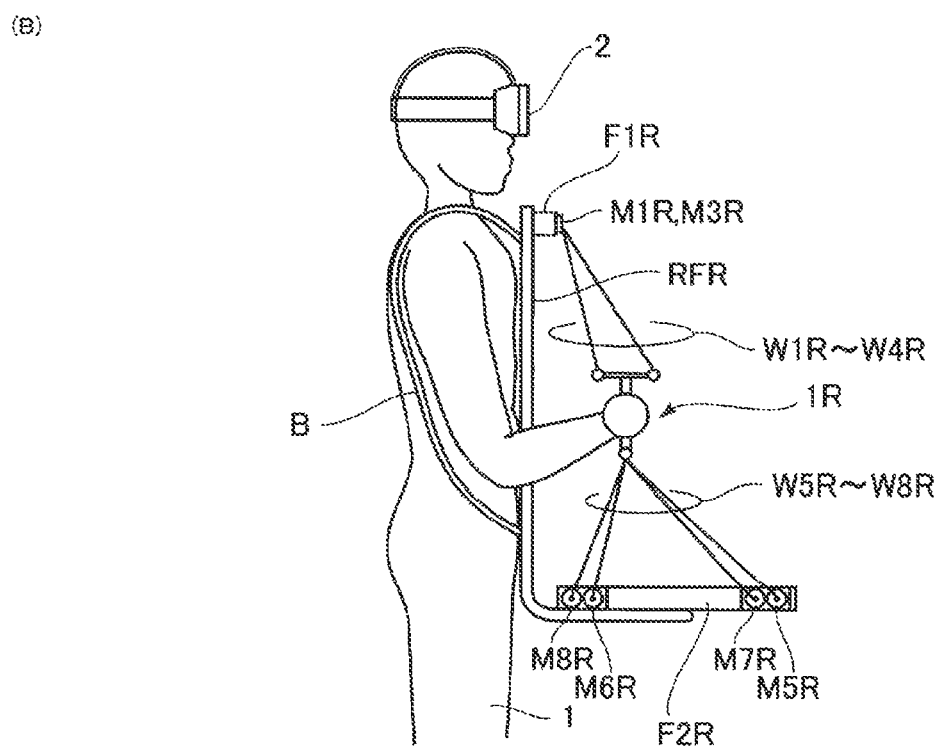

Fig.5
(A)
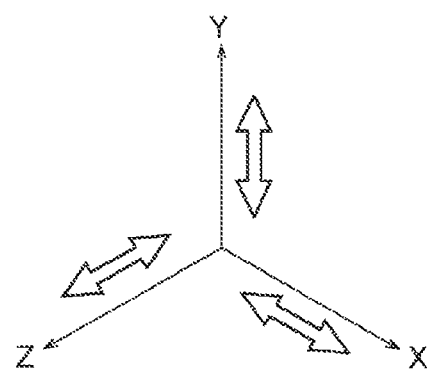
(B)
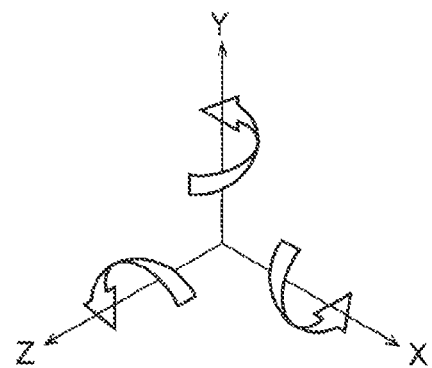

Fig.8
(A)
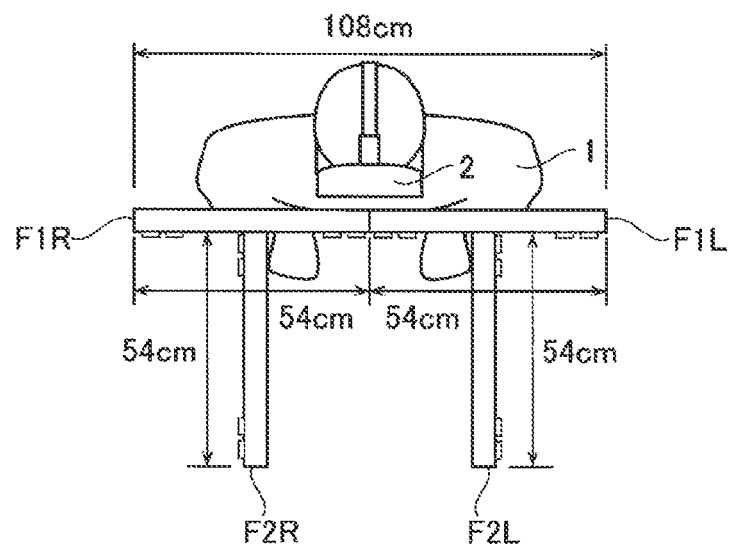
(B)
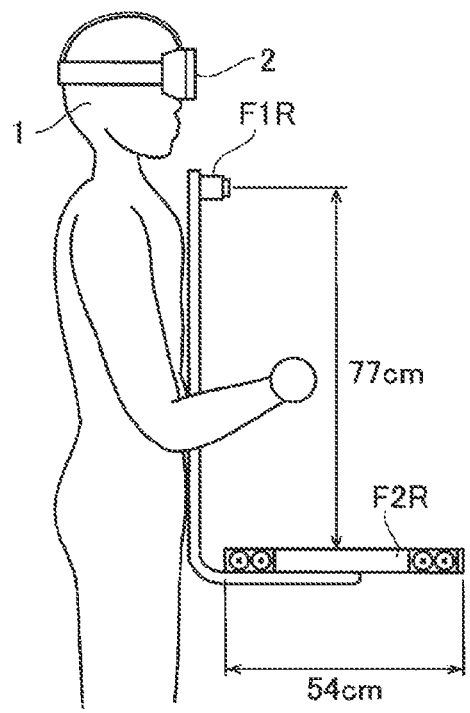

Fig.9
(A)
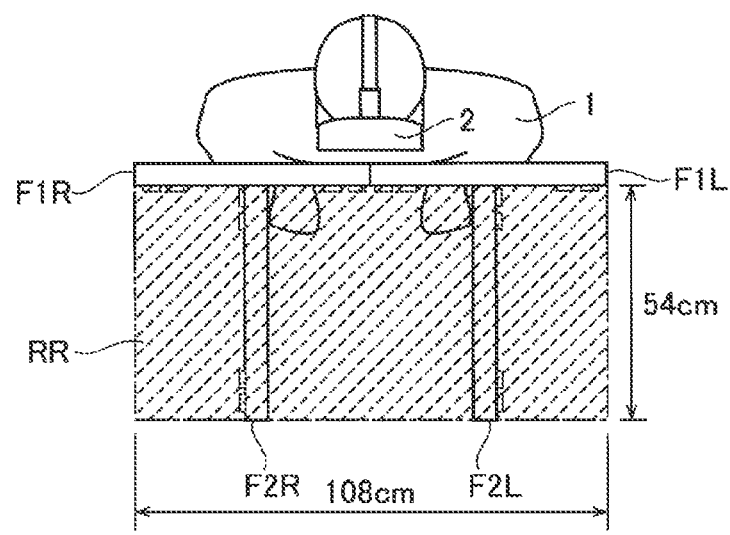
(B)
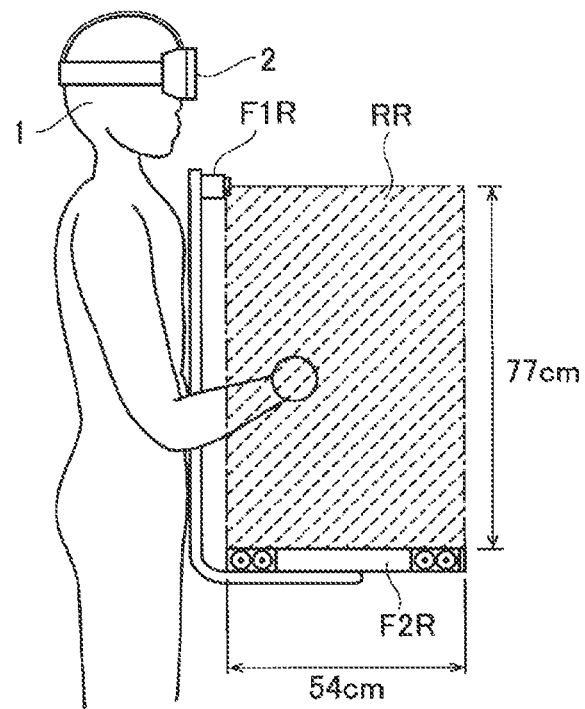

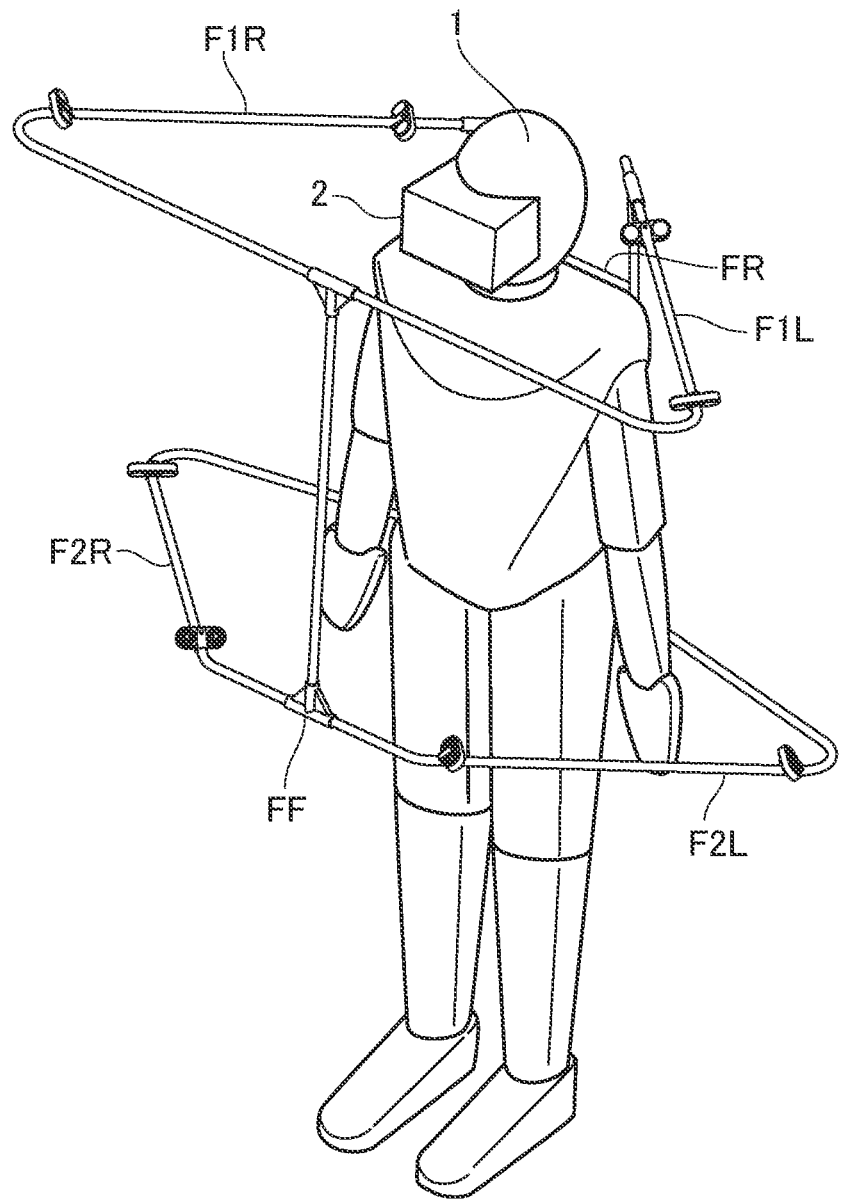

FORCE SENSE PRESENTING APPARATUS

TECHNICAL FIELD

The present invention relates to a wearable force sense presenting apparatus for wrists.

BACKGROUND TECHNOLOGY

Recently, due to the development of head mounted displays (HMDs), an image of a virtual reality (VR) space is displayed right in front of a person, so that the person can feel as if he were in the VR space. That is, the HMD is a wearable visible apparatus mounted on the head of the person, where only the video information of the VR space is displayed while shutting out external information, so that the person can be absorbed in the VR space without seeing the external information.

In order to realize an experience for feeling the VR space as a real world, a force sense presenting apparatus (haptic interface) is required to provide a force sense for touching a virtual object or feeling the weight of the virtual object. Thus, the person enters the VR space using the two senses, i.e., the visible sense and the force sense, so that the person can intuitively operate and feel the virtual object in the VR space.

FIG. 12 is an overall perspective view illustrating a prior art force sense presenting apparatus (see: Patent Literature 1). In FIG. 12, the force sense presenting apparatus is constructed by a right-hand force sense presenting unit and a left-hand force sense presenting unit symmetrically coupled by a rear-side coupling frame FR. Each of the right-hand force sense presenting unit and the left-hand force sense presenting unit is constructed by an end effector 1R or 1L having first, second, third and fourth wire contact points PAR, PBR, PCR and PDR, or PAL, PBL, PCL and PDL; an upper frame F1R or F1L and a lower frame F2R or F2L above and below of the end effector 1R or 1L; first and second motors M1R and M2R, or M1L and M2L on one side and the other side of the upper frame F1R or F1L; third and fourth motors M3R and M4R, or M3L and M4L on one side and the other side of the upper frame F1R or F1L; fifth and sixth motors M5R and M6R, or M5L and M6L on one side and the other side of the lower frame F2R or F2L; seventh and eighth motors M7R and M8R, or M7L and M8L on one side and the other side of the lower frame F2R or F2L; first and second wires W1R and W2R, or W1L and W2L connected between the wire exits of the first and second motors M1R and M2R, or M1L and M2L and the first wire contact point PAR or PAL; third and fourth wires W3R and W4R, or W3L and W4L connected between the wire exits of the third and fourth motors M3R and M4R, or M3L and M4L and the second wire contact point PBR or PBL; fifth and sixth wires W5R and W6R, or W5L and W6L connected between the wire exits of the fifth and sixth motors M5R and M6R, or M5L and M6L and the third wire contact point PCR or PCL; seventh and eighth wires W7R and W8R, or W7L and W8L connected between the wire exits of the seventh and eighth motors M7R and M8R, or M7L and M8L and the fourth wire contact point PDR or PDL, so that the end effector 1R of the right-hand force sense presenting unit and the end effector 1L of the left-hand force sense presenting unit can cooperate with each other. In FIG. 12, note that reference numeral 1 designates a user, and reference numeral 2 designates an HMD.

According to the prior art force sense presenting apparatus of FIG. 12, the end effector 1R of the right-hand force sense presenting unit and the end effector 1L of the left-hand force sense presenting unit can cooperate with each other, to thereby give force sense to both hands of the user, thus realizing a wearable force sense presenting apparatus.

PROCEEDING TECHNOLOGY LITERATURES

Patent Literature

Patent Literature 1: Japanese Patent Publication No. 2016-207005

SUMMARY OF THE INVENTION

Problems to be Solved by the Invention

The above-mentioned prior art force sense presenting apparatus of FIG. 12, however, has the following problems.

FIG. 13 is a perspective view illustrating the frames F1R, F2R, F1L and F2L of the force sense presenting apparatus of FIG. 12, and FIG. 14 is for explaining the distances between the DC motors on the frames F1R, F2R, F1L and F2L of FIG. 13, where (A) is a plan view and (B) is a right-side view. In FIG. 14, the frames F1R, F2R, F1L and F2L are slanted by only 10° with respect to the normal direction. Thus, the force sense presenting apparatus is easily mounted on the user. In FIG. 14, the distances between the DC motors on the frames F1R, F2R, F1L and F2L are 54 cm. In FIGS. 13 and 14, note that an H-shaped front-side coupling frame FF is added to the frames F1R, F2R, F1L and F2L of FIG. 12 to maintain the overall rigidity.

FIG. 15 illustrates force sense presenting regions in which the force sense can be represented from all the directions in the case of the distances between the DC motors on the frames F1R, F2R, F1L and F2L, where (A) is a plan view and (B) is a right-side view. As illustrated in FIG. 15, since the frames F1R, F2R, F1L and F2L are slanted by 10° toward the up direction, the force sense presenting regions are constructed by two 10°-slanted rectangular parallelepipeds with a size of 38.18 cm×38.18 cm×72.68 cm.

In FIG. 15, a region defined by −21.32 cm <x<21.32 cm around the center (x=0) of the user is deviated from the force sense presenting regions. Therefore, there is a problem in that the efficiency of presenting the force sense is low.

Also, the frame structure is of a large size of about 40 cm×120 cm×70 cm, so that there is another problem in that the force sense presenting apparatus is large in size. As a result, a helper would be required when the force sense presenting apparatus is mounted on the user.

Means for Solving the Problems

In order to solve the above-mentioned problems, in a force sense presenting apparatus having a right-hand force sense presenting unit and a left-hand force sense presenting unit, one side of an upper frame of the right-hand force sense presenting unit is linearly coupled to the one side of the upper frame of the left-hand force sense presenting unit. The force sense presenting apparatus is constructed by a right-hand rear-coupled frame coupling an approximately middle location of the upper frame in the right-hand force sense presenting unit to one side of a lower frame in the right-hand force sense presenting unit so that the upper frame and the lower frame in the right-hand force sense presenting unit are approximately T-shaped viewed from the top, and a left-hand rear-coupled frame coupling an approximately middle location of the upper frame in the left-hand force sense presenting unit to the one side of the lower frame in the left-hand force sense presenting unit so that the upper frame and the lower frame in the left-hand force sense presenting unit are approximately T-shaped viewed from the top, thus making the end effector of the right-hand force sense presenting unit and the end effector of the left-hand force sense presenting unit cooperate with each other.

Effect of the Invention

According to the present invention, since the center region of the user can be also an effective force sense presenting region, the efficiency of presenting the force sense can be increased. Also, since the frame structure can be small in size, a small-sized and lighter force sense presenting apparatus can be realized. Therefore, the mounting of the force sense presenting apparatus can be easily carried out without a helper.

BRIEF DESCRIPTION OF THE DRAWINGS

[FIG. 3] Schematic views of the force sense presenting apparatus of FIG. 1, where (A) is a plan view and (B) is a right-side view.

[FIG. 5] Views for explaining the translational and rotational motions of the end effector of FIG. 1.

[FIG. 8] Views for explaining the distances between the DC motors on the frames of FIG. 7, where (A) is a plan view and (B) is a right-side view.

[FIG. 9] Views of the force sense presenting region which can represent the force senses from all the directions in the case of the distances between the DC motors on the frames of FIG. 8, where (A) is a plan view and (B) is a right-side view.

[FIG. 13] A perspective view illustrating the frames of the force sense presenting apparatus of FIG. 12.

EMBODIMENTS

Figure 1:
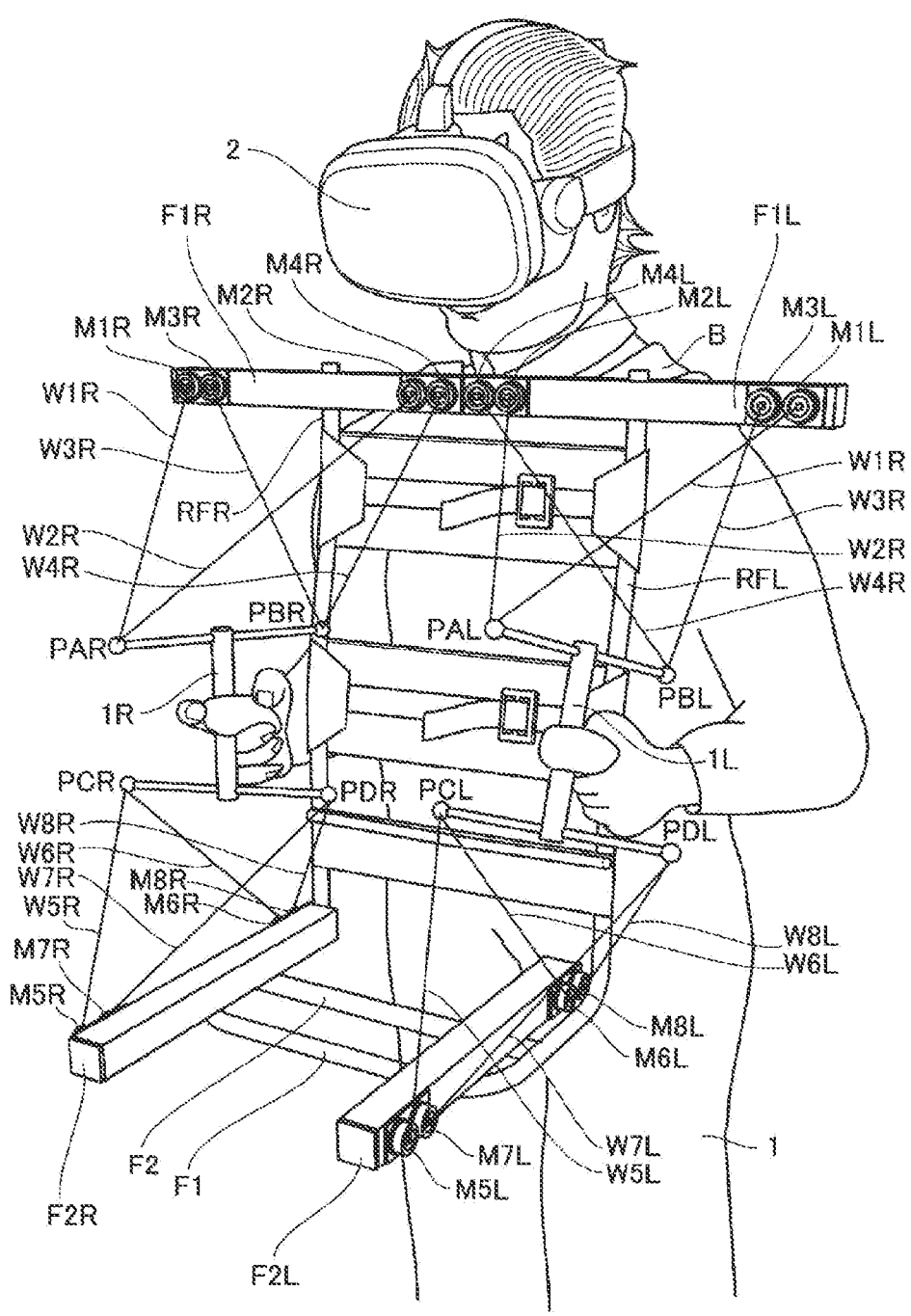
[FIG. 1] An overall perspective view illustrating a first embodiment of the force sense presenting apparatus according to the present invention.
Figure 2:
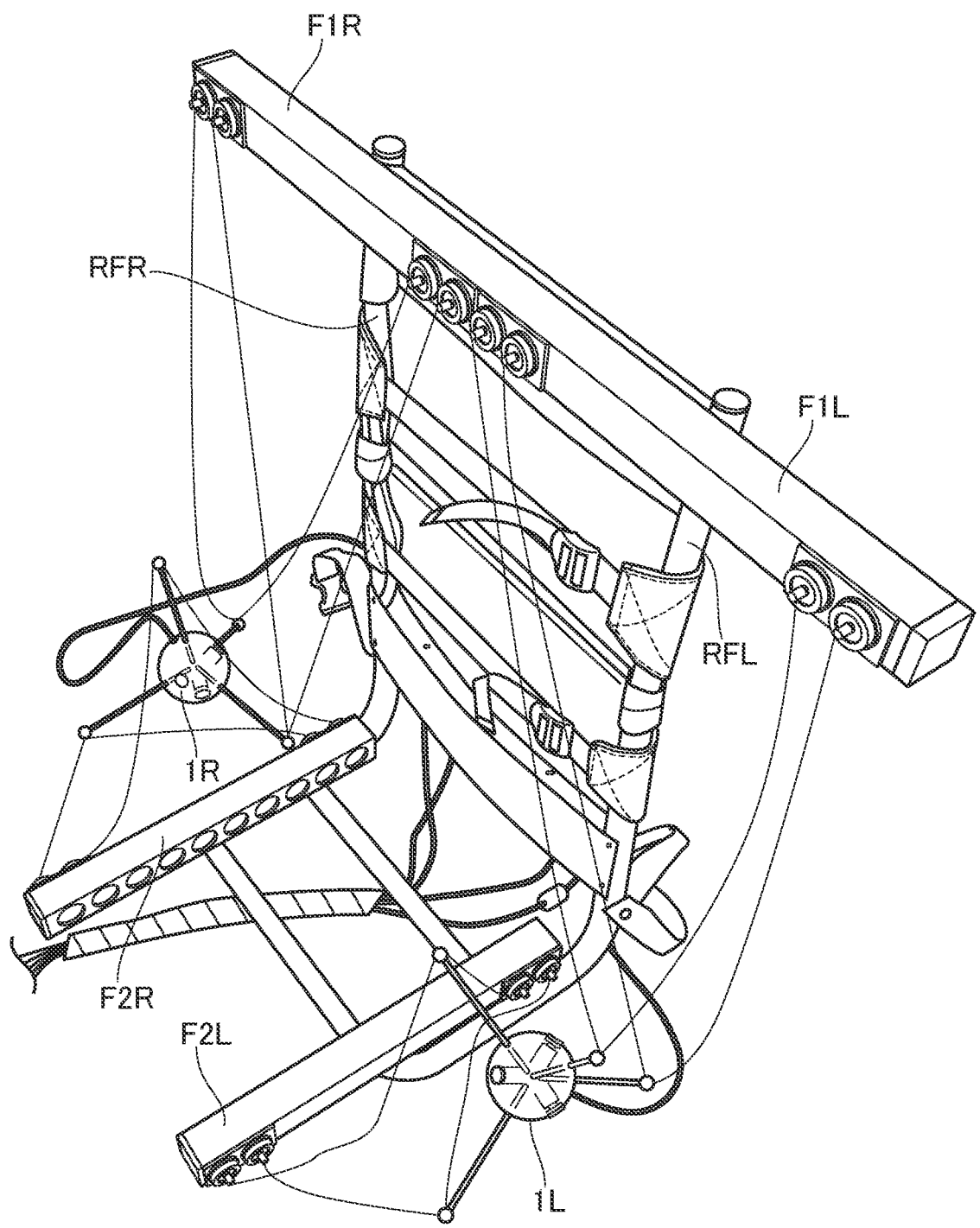
[FIG. 2] A perspective view of the force sense presenting apparatus of FIG. 1 before mounting.

FIG. 1 is an overall perspective view illustrating a first embodiment of the force sense presenting apparatus according to the present invention, FIG. 2 is a perspective view of the force sense presenting apparatus of FIG. 1 before mounting, and FIG. 3 indicates schematic views of the force sense presenting apparatus of FIG. 1, where (A) is a plan view and (B) is a right-side view. FIGS. 1 and 3 is of a type which is carried on a person's chest.

In FIGS. 1 and 3, a right-hand force sense presenting unit formed by an end effector 1R, an upper frame F1R and a lower frame F2R is symmetrically coupled to a left-hand force sense presenting unit formed by an end effector 1L, an upper frame F1L and a lower frame F2L by rear-side coupling frames RFR and RFL. The rear-side coupling frames RFR and RFL are coupled to a shoulder band B which is attached to the shoulder of a user 1. Note that the rear-side coupling frames RFR and RFL can be hung on the shoulder by a reverse U-shaped fixed tool instead of the shoulder band B.

The upper frame F1R of the right-hand force sense presenting unit is approximately linearly coupled to the upper frame F1L of the left-hand force sense presenting unit viewed from the top. Note that the upper frame F1R and the lower frame F1L can be formed in one body.

In the right-hand force sense presenting unit, an approximate intermediate position of the upper frame F1R is coupled to one side of the lower frame F2R in an approximately T-shaped configuration viewed from the top. Similarly, in the left-hand force sense presenting unit, an approximate intermediate position of the upper frame F1L is coupled to one side of the lower frame F2L in an approximately T-shaped configuration viewed from the top. Also, the lower frame F2R is coupled to the lower frame F2L by reinforced frames F1 and F2.

In FIGS. 1 and 3, provided between four wire contact points (fixed points) PAR, PBR, PCR and PDR of the end effector 1R attached to the right-hand of the user 1 and rotary encoder associated DC motors (or coreless motors) M1R, M2R, . . . , M8R (precisely, pulleys as wire exits directly connected thereto) are wires W1R, W2R, . . . , W8R made of metal or fiber. Concretely, provided between the wire contact point PAR of the end effector 1R and the rotary encoder associated DC motors M1R and M2R (precisely pulleys as wire exits directly connected thereto) are the wires W1R and W2R. Also, provided between the wire contact point PBR of the end effector 1R and the rotary encoder associated DC motors M3R and M4R (precisely pulleys as wire exits directly connected thereto) are the wires W3R and W4R. Additionally, provided between the wire contact point PCR of the end effector 1R and the rotary encoder associated DC motors M5R and M6R (precisely pulleys as wire exits directly connected thereto) are the wires W5R and W6R. Furthermore, provided between the wire contact point PDR of the end effector 1R and the rotary encoder associated DC motors M7R and M8R (precisely pulleys as wire exits directly connected thereto) are the wires W7R and W8R.

In FIGS. 1 and 3, provided between four wire contact points (fixed points) PAL, PBL, PCL and PDL of the end effector 1L attached to the right-hand of the user 1 and rotary encoder associated DC motors (or coreless motors) M1L, M2L, . . . , M8L (precisely, pulleys as wire exits directly connected thereto) are wires W1L, W2L, . . . , W8L made of metal or fiber. Concretely, provided between the wire contact point PAL of the end effector 1L and the rotary encoder associated DC motors M1L and M2L (precisely pulleys as wire exits directly connected thereto) are the wires W1L and W2L. Also, provided between the wire contact point PBL of the end effector 1L and the rotary encoder associated DC motors M3L and M4L (precisely pulleys as wire exits directly connected thereto) are the wires W3L and W4L. Additionally, provided between the wire contact point PCL of the end effector 1L and the rotary encoder associated DC motors M5L and M6L (precisely pulleys as wire exits directly connected thereto) are the wires W5L and W6L. Furthermore, provided between the wire contact point PDL of the end effector 1L and the rotary encoder associated DC motors M7L and M8L (precisely pulleys as wire exits directly connected thereto) are the wires W7L and W8L.

Mounted on the head of the user 1 is an HMD 2. Note that a large-scale screen as a virtual video generating means can be used instead of the HMD 2.

The rotary encoder associated DC motors M1R, M2R, ..., M8R; M1L, M2L, ..., M8L and the HMD 2 are connected to a DC motor controller (not shown) provided between the two rear-side coupling frames RFR and RFL. Further, the HMD 2 and the DC motor controller are connected to a personal computer (not shown).

Figure 4:
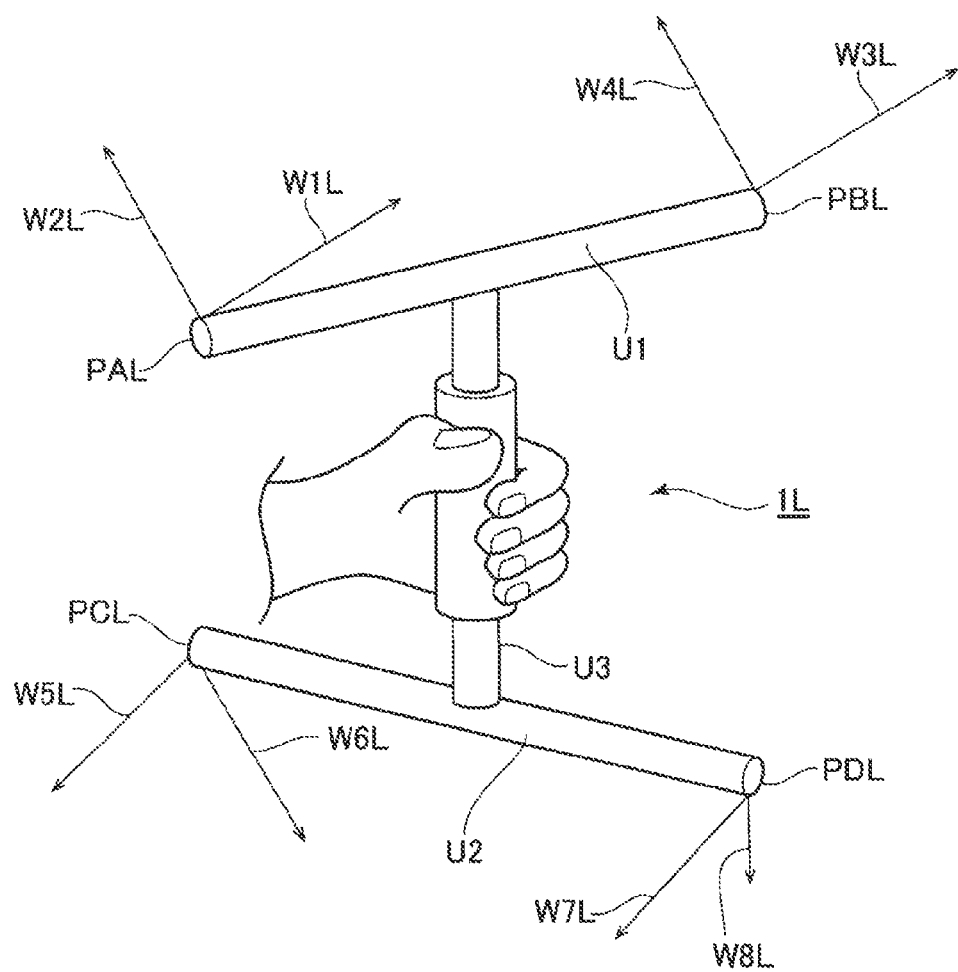
[FIG. 4] A perspective view of the right-side end effector of FIG. 1.

FIG. 4 is a perspective view illustrating the end effector 1L of FIGS. 1 and 3.

In the end effector 1L of FIG. 4, linear members U1 and U2 formed by aluminum pipes are approximately perpendicularly cross-shaped viewed from the top, and a grip member U3 is coupled between the members U1 and U2. Therefore, the grip member U3 is configured to be grasped by the left hand of the user 1. In this case, as shown in the perspective view of FIG. 2, the members U1 and U2 can be bent above or below to make the members U1 and U2 V-shaped. As a result, the member U1 can be directly coupled to the member U2, and the grip member U3 can be coupled to the members U1 and U2. The same is applied to the end effector 1R.

Figure 6:
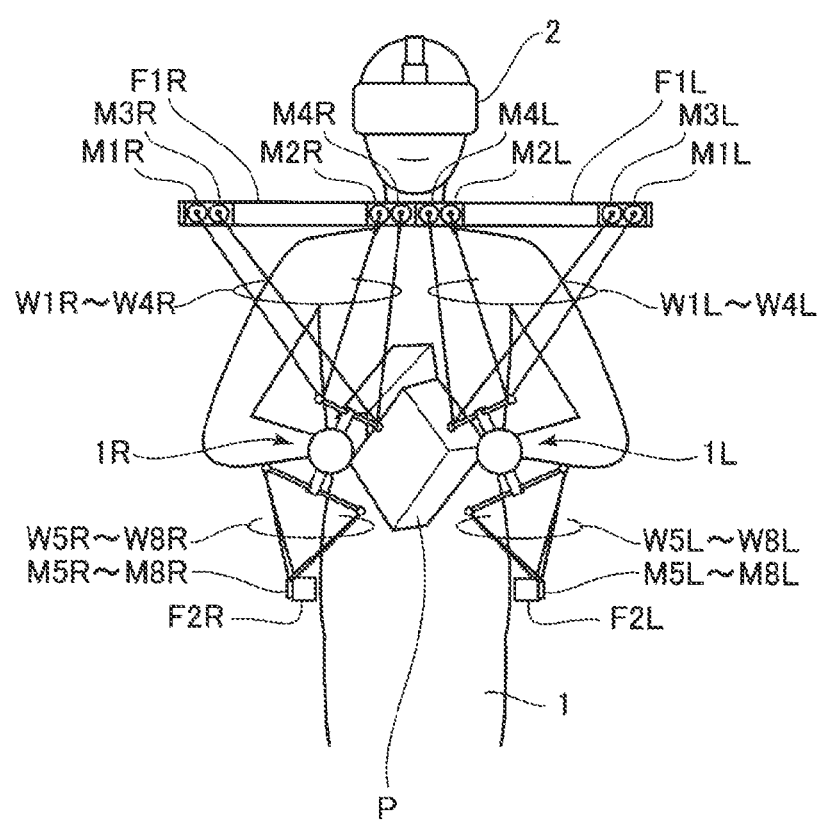
[FIG. 6] A view illustrating the operation state of the force sense presenting apparatus of FIG. 1.

In the force sense presenting apparatus of FIG. 1, as illustrated in FIG. 5, the end effector 1R (1L) carries out 3-axis translational motions by 3 degrees of freedom and 3-axis rotational motions by 3 degrees of freedom, i.e., motions by six degrees of freedom as illustrated in FIG. 5. Therefore, the end effector 1R and the end effector 1L cooperate, so that motions by translational and rotational motions by six degrees of freedom using two hands can be realized upon a virtual object P of FIG. 6 within the VR space. That is, the user 1 carries the force sense presenting apparatus in front of his body as a fore rucksack and the end effectors 1R and 1L are mounted on both hands of the user 1. The HMD 2 is mounted on the head of the user 1, so that the user 1 can be absorbed in the VR space and the user 1 can operate the virtual object P by his two hands. In this case, the force sense is fed back via the end effectors 1R and 1L to the user 1, so that the user 1 can feel as if he grasped and moved the virtual object P.

Figure 7:
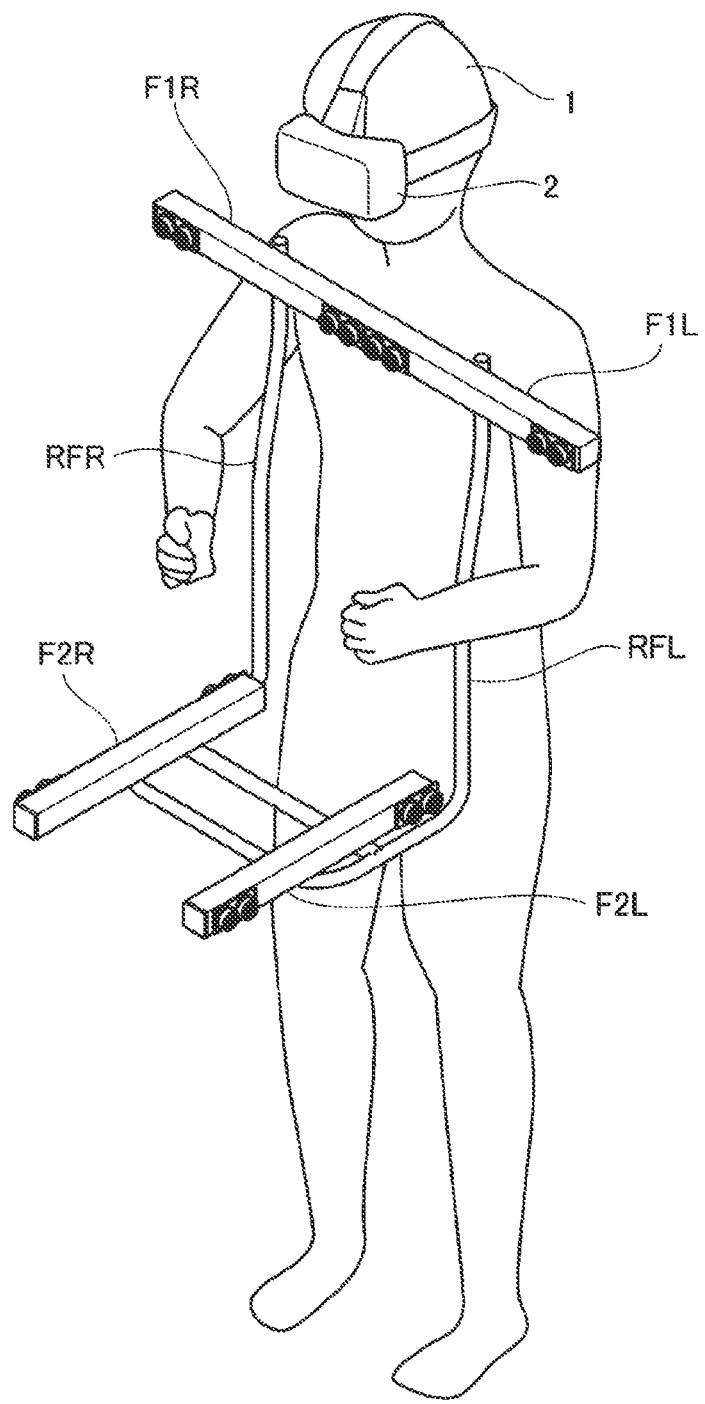
[FIG. 7] A perspective view illustrating the frames of the force sense presenting apparatus of FIG. 1.

FIG. 7 is a perspective view illustrating the frames F1R, F1L, F1L and F2L of the force sense presenting apparatus of FIG. 1, FIG. 8 is for explaining the distances between the DC motors on the frames F1R, F2R, F1L and F2L of FIG. 7, where (A) is a front view and (B) is a right-side view. In FIG. 8, the distance between the DC motors on the frames F1R, F2R, F1L and F2L is 54 cm.

FIG. 9 illustrates a force sense presenting region representing the force sense from all the directions in the distances between the DC motors on the frames F1R, F2R, F1L and F2L of FIG. 8. As indicated by a shaded portion in FIG. 9, the force sense presenting region RR is a rectangular parallelepiped region of about 54 cm×108 cm×77 cm. In FIG. 9, a region around the center of the user 1 is also included in the force sense presenting region RR. Therefore, the presenting efficiency can be increased. Also, the frame structure having a size of about 54 cm×108 cm×77 cm can be small in size, and therefore, the force sense presenting apparatus can be light in weight. As a result, the mounting of the force sense presenting apparatus can be carried out without a helper.

Even in the first embodiment, the same or large translational forces, torques and response characteristics than those of the prior art force sense presenting apparatus can be obtained.

Figure 10:
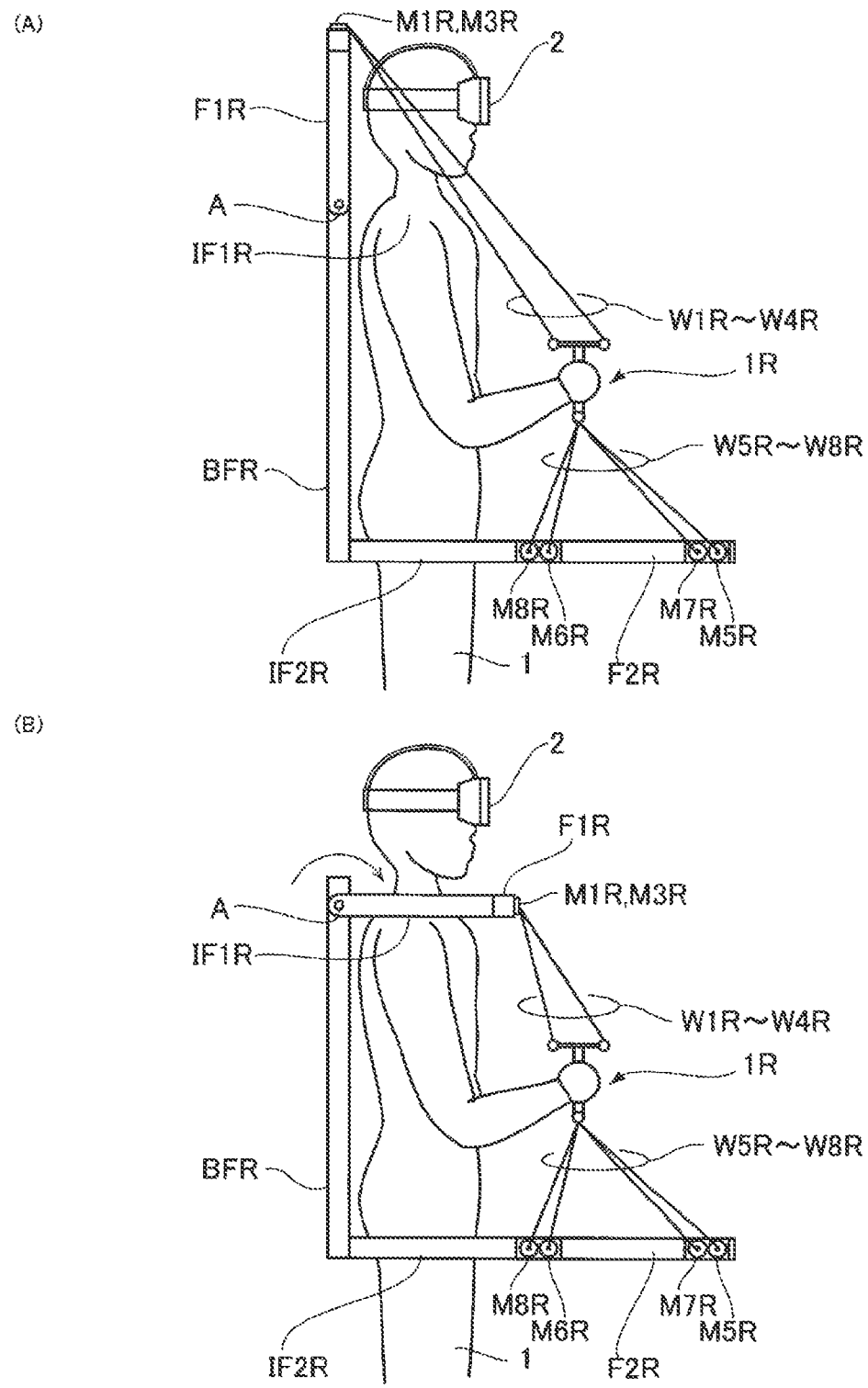
[FIG. 10] Right-side views illustrating a second embodiment of the force sense presenting apparatus according to the present invention.

FIG. 10 shows right-side views illustrating a second embodiment of the force sense presenting apparatus according to the present invention, where (A) shows a state immediately before mounting and (B) shows a state immediately after mounting. In FIG. 10, the force sense presenting apparatus is of a type carrying it on the back of the user, and the upper frame is of a pivotal type.

In FIG. 10, the upper frames F1R and F1L are rotatable for the axis A of the rear-side coupling frames RFR and RFL via intermediate upper frames IF1R and IF1L. On the other hand, the lower frames F2R and F2L are fixed to the rear-side coupling frames RFR and RFL via intermediate lower frames IF2R and IF2L.

The mounting of the force sense presenting apparatus of FIG. 10 will be now explained. First, as illustrated in (A) of FIG. 10, the intermediate upper frame IF1R and IF1L are rotated above so that the upper frames F1R and F1L are located above. In this state, the user 1 carries the rear-side coupling frames RFR and RFL on his back. Next, as illustrated in (B) of FIG. 10, the intermediate upper frame IF1R and IF1L are rotated below so that the upper frames F1R and F1L are located below. When demounting the force sense presenting apparatus of FIG. 10, the reverse operations would be carried out.

Figure 11:
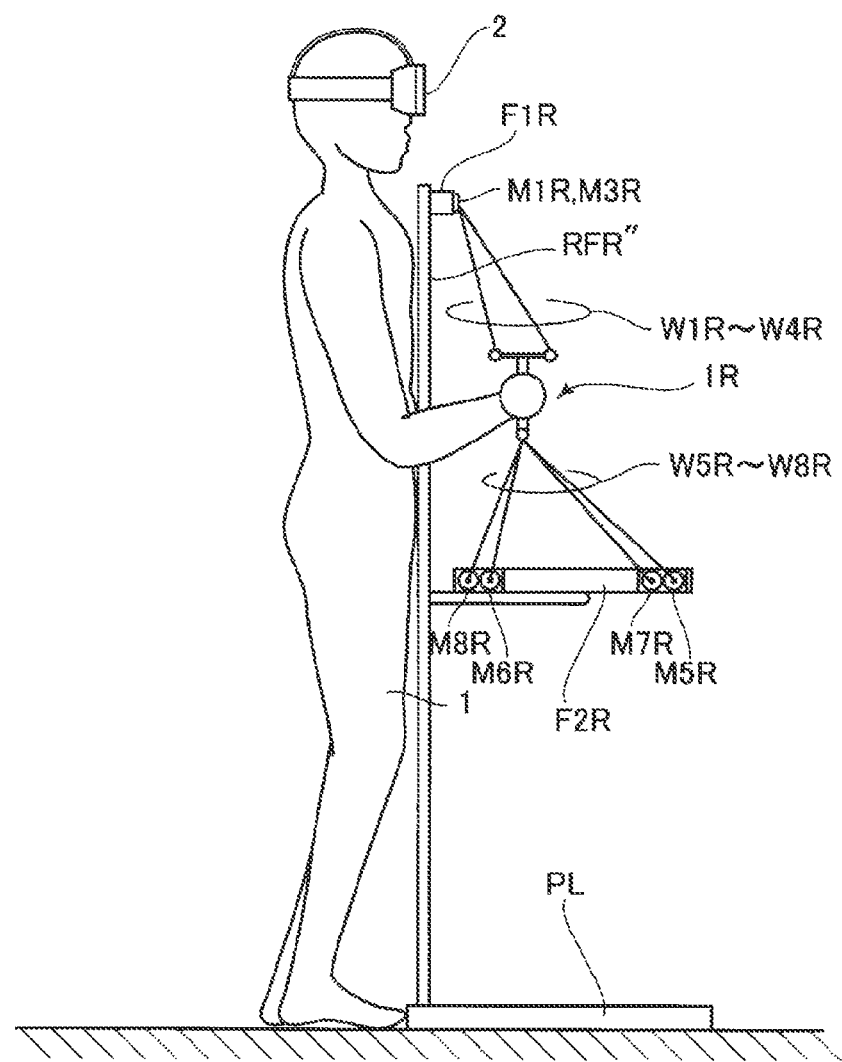
[FIG. 11] Right-side views illustrating a third embodiment of the force sense presenting apparatus according to the present invention.
Figure 12:
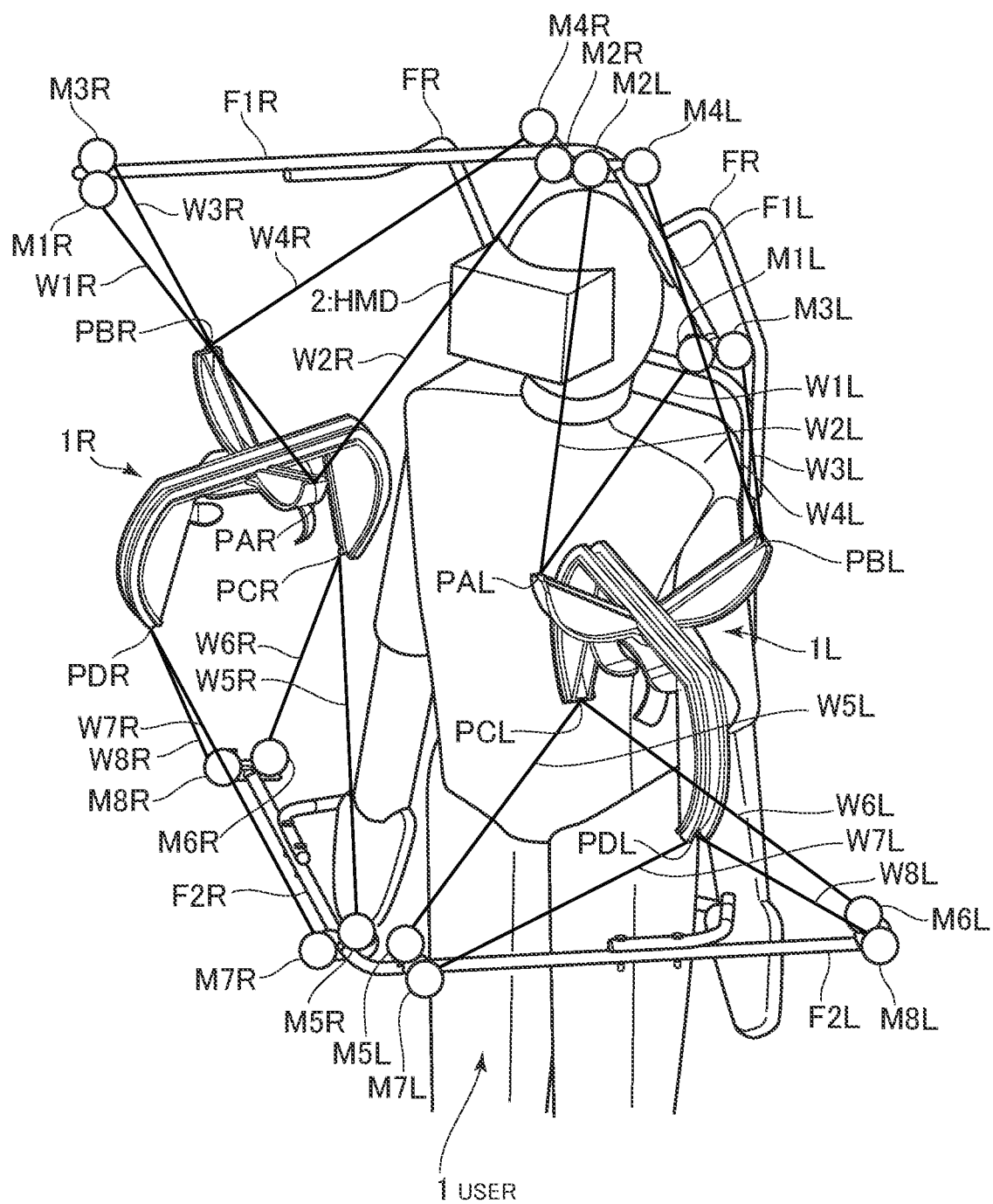
[FIG. 12] An entire perspective view illustrating a prior art force sense presenting apparatus.
Figure 14A:
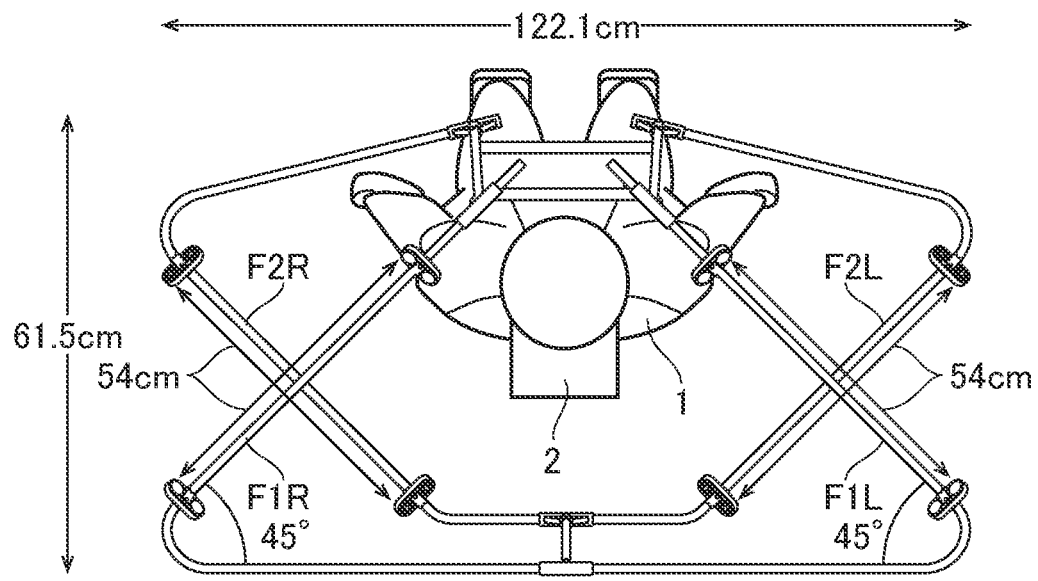
[FIG. 14] Views for explaining the distances between the DC motors on the frames of FIG. 13, where (A) is a plan view and (B) is a right-side view.
Figure 14B:
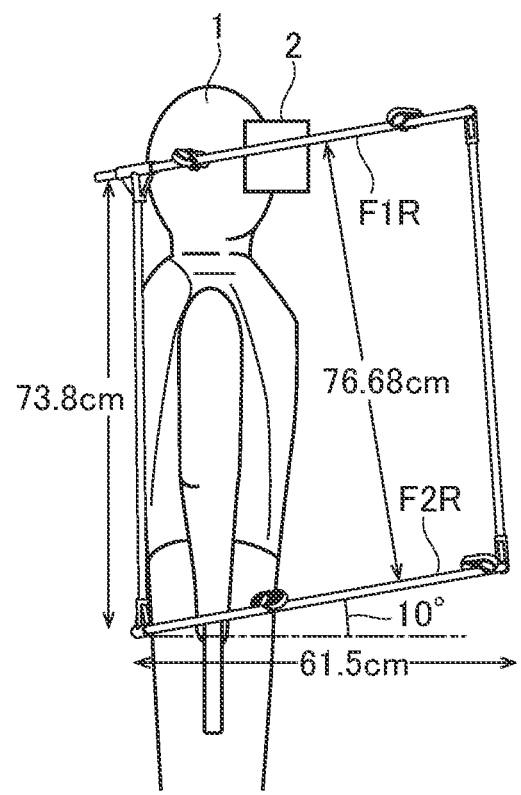
Figure 15A:
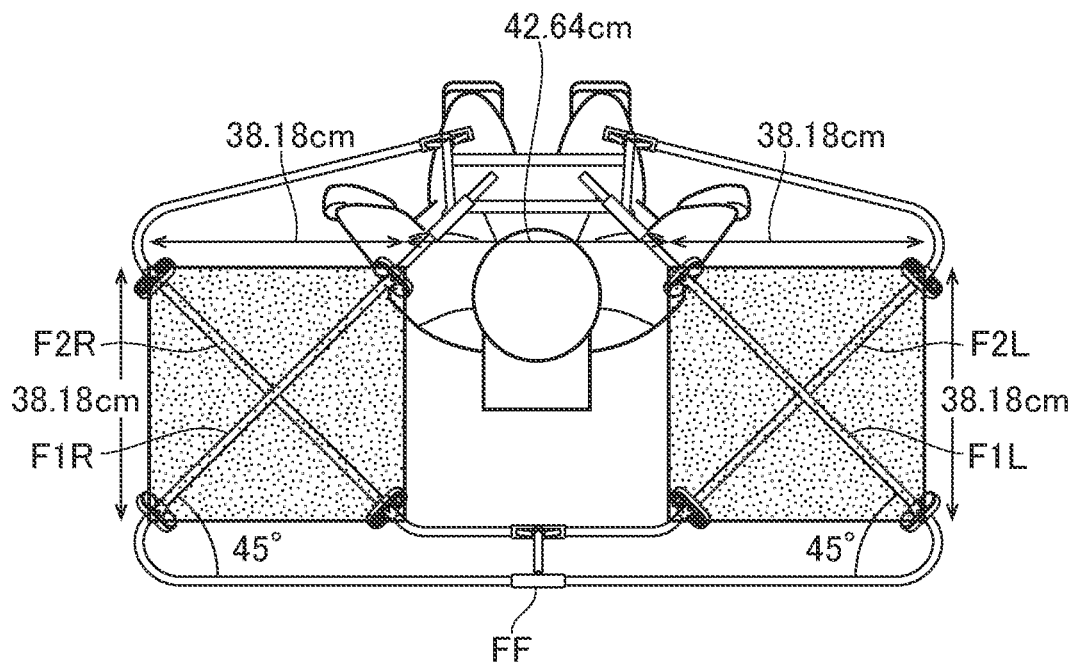
[FIG. 15] Views of the force sense presenting region which can represent the force sense from all the directions in the case of the distances between the DC motors on the frames of FIG. 14, where (A) is a plan view and (B) is a right-side view.
Figure 15B:
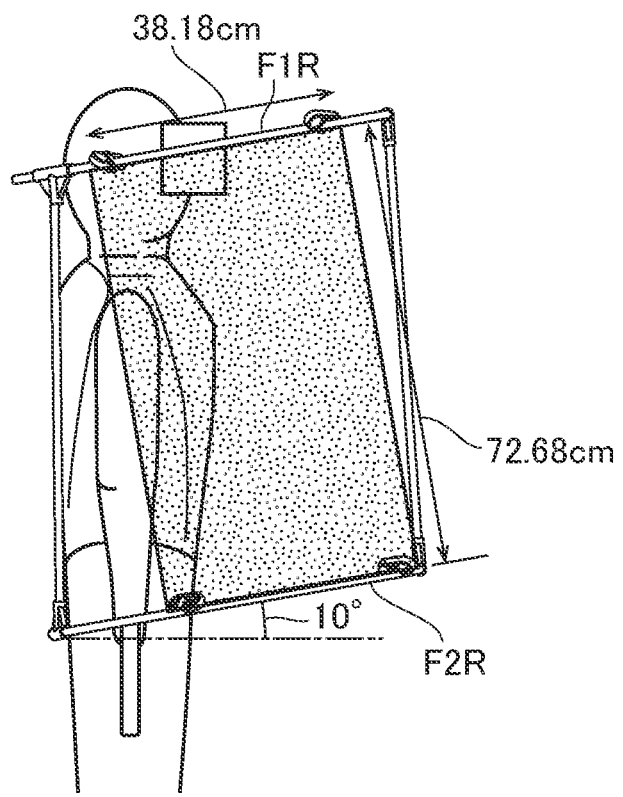

FIG. 11 shows right-side views illustrating a third embodiment of the force sense presenting apparatus according to the present invention. The force sense presenting apparatus of FIG. 11 is of a floor-fixed type.

In FIG. 11, rear-side coupling frames RFR' and RFL' extend to the floor and are fixed thereto and a support plate PL is provided instead of the rear-side coupling frames RFR and RFL of FIG. 1. Therefore, the rear-side coupling frames RFR' and RFL' are fixed to the support plate PL, so that the rear-side coupling frames RFR' and RFL' can be fixed to the floor. In this case, since the mounting operation is unnecessary, the shoulder band B or the reverse U-shaped fixed tool are unnecessary.

Note that the present invention can be applied to any alterations within the obvious scope of the above-mentioned embodiments.

DESCRIPTION OF THE SYMBOLS

1: user
1R: right-hand end effector
1L: left-hand end effector
F1R, F2R, F1L, F2L: frames
RFR, RFL, RFR', RFL': rear-side coupling frames
F1, F2: frames
IF1R, IF1L: intermediate upper frames
IF2R, IF2L: intermediate lower frames
M1R, M2R, ..., M8R; M1L, M2L, ..., M8L: rotary encoder associated DC motors
W1R, W2R, ..., W8R; W1L, W2L, ..., W8L: wires
PAR, PBR, PCR, PDR, PAL, PBL, PCL, PDL: wire contact points 2: head mounted display (HMD)
P: virtual object
PL: support plate
RR: force sense presenting region

The invention claimed is:
1. A force sense presenting apparatus comprising a right-hand force sense presenting unit and a left-hand force sense presenting unit, each of said force sense presenting units comprising:
an end effector having first, second, third and fourth wire contact points;
an upper frame and a lower frame positioned above and below said end effector, respectively;
first and second motors at one side and another side, respectively, of said upper frame;
third and fourth motors at said one side and said other side, respectively, of said upper frame;
fifth and sixth motors at one side and another side, respectively, of said lower frame;
seventh and eighth motors at said one side and said other side, respectively, of said lower frame;
first and second wires connected between wire exits of each of said first and second motors and said first wire contact point;
third and fourth wires connected between a wire exit of each of said third and fourth motors and said second wire contact point;
fifth and sixth wires connected between a wire exit of each of said fifth and sixth motors and said third wire contact point; and
seventh and eighth wires connected between a wire exit of each of said seventh and eighth motors and said fourth wire contact point,
wherein:
said one side of said upper frame of said right-hand force sense presenting unit is linearly coupled to said one side of said upper frame of said left-hand force sense presenting unit,
said force sense presenting apparatus further comprises:
a right-hand rear-side coupling frame coupling an approximately middle location of said upper frame in said right-hand force sense presenting unit to said one side of said lower frame in said right-hand force sense presenting unit so that said upper frame and said lower frame in said right-hand force sense presenting unit are approximately T-shaped viewed from the top; and
a left-hand rear-side coupling frame coupling an approximately middle location of said upper frame in said left-hand force sense presenting unit to said one side of said lower frame in said left-hand force sense presenting unit so that said upper frame and said lower frame in said left-hand force sense presenting unit are approximately T-shaped viewed from the top, and
the end effector of said right-hand force sense presenting unit and the end effector of said left-hand force sense presenting unit cooperate with each other.
2. The force sense presenting apparatus as set forth in claim 1, further comprising one shoulder band or one reverse U-shaped fixed tool coupled to each of said right-hand rear-side coupling frame and said left-hand rear-side coupling frame.
3. The force sense presenting apparatus as set forth in claim 1, further comprising:
a right-hand intermediate upper frame adapted to rotatably support said upper frame in said right-hand force sense presenting unit for said right-hand rear-side coupling frame;
a left-hand intermediate upper frame adapted to rotatably support said upper frame in said left-hand force sense presenting unit for said left-hand rear-side coupling frame;
a right-hand intermediate lower frame adapted to fixedly support said lower frame in said left-hand force sense presenting unit for said right-hand rear-side coupling frame; and
a left-hand intermediate lower frame adapted to fixedly support said lower frame in said left-hand force sense presenting unit for said left-hand rear-side coupling frame.
4. The force sense presenting apparatus as set forth in claim 1, further comprising a support plate to which said right-hand rear-side coupling frame and said left-hand rear-side coupling frame are extended to be fixed.
5. The force sense presenting apparatus as set forth in claim 1, wherein said end effector comprises:
a first linear member on which said first and second wire contact points are provided;
a second linear member on which said third and fourth contact points are provided; and
a grip member coupled between said first and second linear members,
said first and second linear members being approximately perpendicularly cross-shaped viewed from the top.
6. The force sense presenting apparatus as set forth in claim 1, wherein said end effector comprises:
a first V-shaped member on which said first and second wire contact points are provided;
a second V-shaped member on which said third and fourth contact points are provided, said second V-shaped member being coupled to said first V-shaped member; and
a grip member coupled to said first or second linear member,
said first and second V-shaped members being approximately perpendicularly cross-shaped viewed from the top.
7. The force sense presenting apparatus as set forth in claim 1, wherein a distance between said first and second motors, a distance between said third and fourth motors, a distance between said fifth and sixth motors, and a distance between said seventh and eighth motors are equal to each other.
8. A force sense presenting apparatus comprising a right-hand force sense presenting unit and a left-hand force sense presenting unit, each of said force sense presenting units comprising:
an end effector having first and second wire contact points;
an upper frame and a lower frame positioned above and below said end effector, respectively;
first and second motors at one side and another side, respectively, of said upper frame;
third and fourth motors at said one side and said other side, respectively, of said lower frame;
first and second wires connected between wire exits of each of said first and second motors and said first wire contact point; and
third and fourth wires connected between a wire exit of each of said third and fourth motors and said second wire contact point, wherein:
said one side of said upper frame of said right-hand force sense presenting unit is linearly coupled to said one side of said upper frame of said left-hand force sense presenting unit,
said force sense presenting apparatus further comprises:
   a right-hand rear-side coupling frame coupling an approximately middle location of said upper frame in said right-hand force sense presenting unit to said one side of said lower frame in said right-hand force sense presenting unit so that said upper frame and said lower frame in said right-hand force sense presenting unit are approximately T-shaped viewed from the top; and
   a left-hand rear-side coupling frame coupling an approximately middle location of said upper frame in said left-hand force sense presenting unit to said one side of said lower frame in said left-hand force sense presenting unit so that said upper frame and said lower frame in said left-hand force sense presenting unit are approximately T-shaped viewed from the top, and
the end effector of said right-hand force sense presenting unit and the end effector of said left-hand force sense presenting unit cooperate with each other.

9. The force sense presenting apparatus as set forth in claim 8, further comprising one shoulder band or one reverse U-shaped fixed tool coupled to each of said right-hand rear-side coupling frame and said left-hand rear-side coupling frame.

10. The force sense presenting apparatus as set forth in claim 8, further comprising:
   a right-hand intermediate upper frame adapted to rotatably support said upper frame in said right-hand force sense presenting unit for said right-hand rear-side coupling frame;
   a left-hand intermediate upper frame adapted to rotatably support said upper frame in said left-hand force sense presenting unit for said left-hand rear-side coupling frame;
   a right-hand intermediate lower frame adapted to fixedly support said lower frame in said left-hand force sense presenting unit for said right-hand rear-side coupling frame; and
   a left-hand intermediate lower frame adapted to fixedly support said lower frame in said left-hand force sense presenting unit for said left-hand rear-side coupling frame.

11. The force sense presenting apparatus as set forth in claim 8, further comprising a support plate to which said right-hand rear-side coupling frame and said left-hand rear-side are extended to be fixed.

12. The force sense presenting apparatus as set forth in claim 8, wherein said end effector further has third and fourth wire contact points, each of said force sense presenting units further comprising:
   fifth and sixth motors at one side and another side, respectively, of said upper frame;
   seventh and eighth motors at said one side and said other side, respectively, of said lower frame;
   fifth and sixth wires connected between wire exits of each of said fifth and sixth motors and said third wire contact point; and
   seventh and eighth wires connected between a wire exit of each of said seventh and eighth motors and said fourth wire contact point.

13. The force sense presenting apparatus as set forth in claim 12, wherein said end effector comprises:
   a first linear member on which said first and third wire contact points are provided;
   a second linear member on which said second and fourth contact points are provided; and
   a grip member coupled between said first and second linear members,
   said first and second linear members being approximately perpendicularly cross-shaped viewed from the top.

14. The force sense presenting apparatus as set forth in claim 12, wherein said end effector comprises:
   a first V-shaped member on which said first and third wire contact points are provided;
   a second V-shaped member on which said second and fourth contact points are provided, said second V-shaped member being coupled to said first V-shaped member; and
   a grip member coupled to said first or second linear member,
   said first and second V-shaped members being approximately perpendicularly cross-shaped viewed from the top.

15. The force sense presenting apparatus as set forth in claim 12, wherein a distance between said first and second motors, a distance between said third and fourth motors, a distance between said fifth and sixth motors, and a distance between said seventh and eighth motors are equal to each other.

* * * * *